No. 813,477. PATENTED FEB. 27, 1906.
C. C. WORTHINGTON.
VEHICLE WHEEL TIRE.
APPLICATION FILED AUG. 11, 1904.
2 SHEETS—SHEET 1.
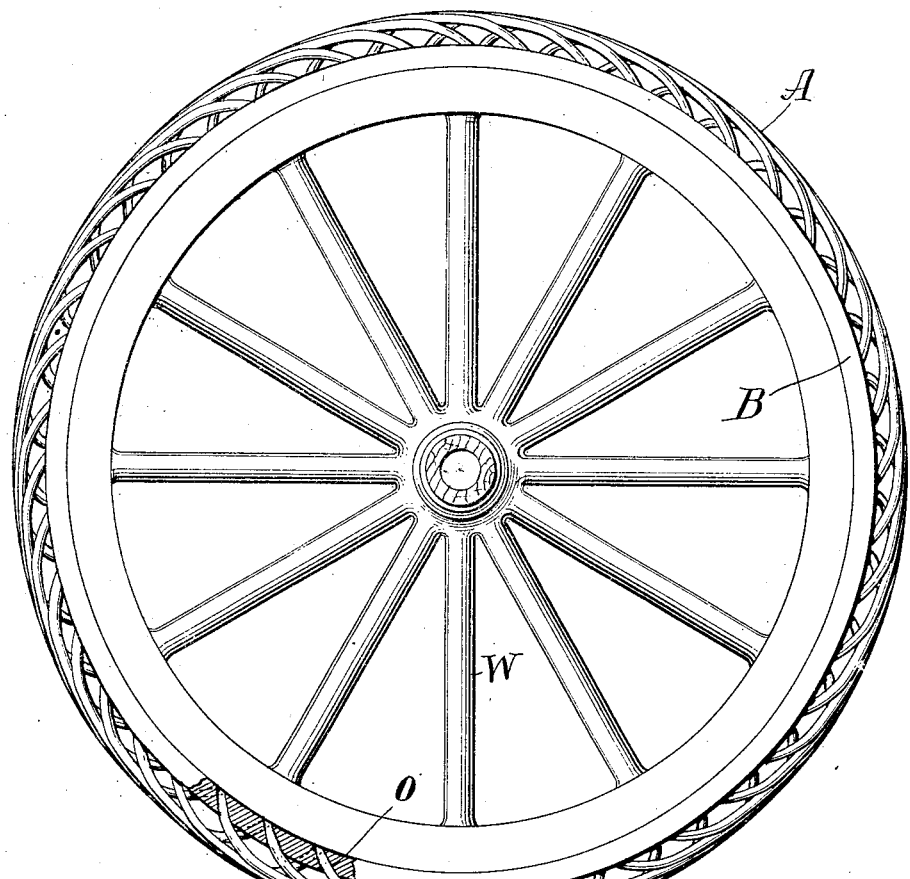
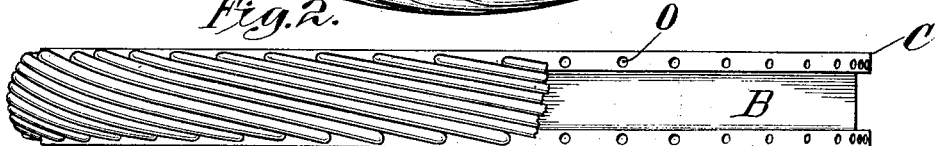
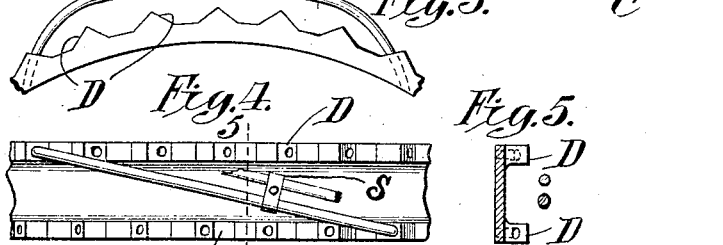
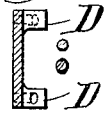
Witnesses: Edgworth Greene, S. H. Kimball
Inventor: Charles C. Worthington
By his Attorneys No. 813,477. PATENTED FEB. 27, 1906.
C. C. WORTHINGTON.
VEHICLE WHEEL TIRE.
APPLICATION FILED AUG. 11, 1904.
2 SHEETS—SHEET 2.
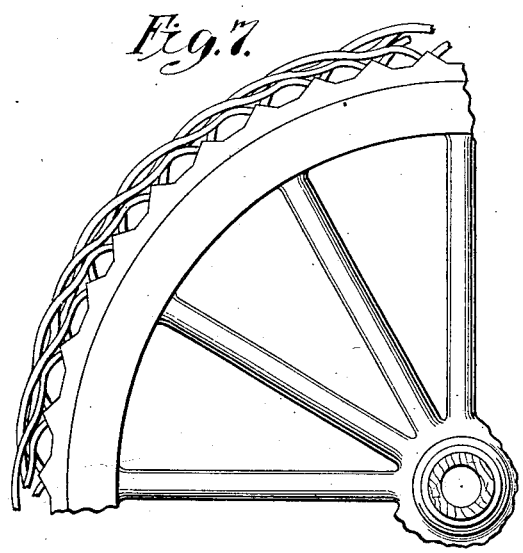
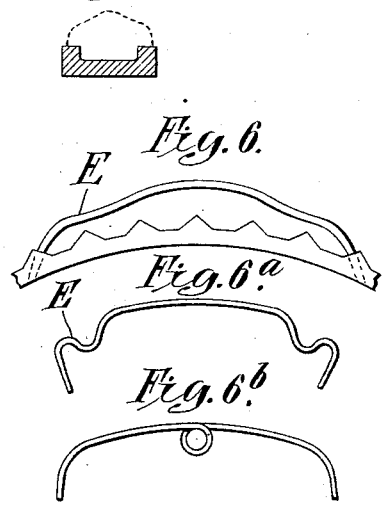
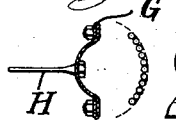
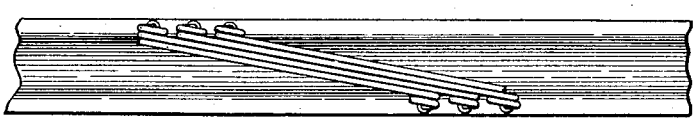

UNITED STATES PATENT OFFICE.

CHARLES C. WORTHINGTON, OF DUNNFIELD, NEW JERSEY.

VEHICLE-WHEEL TIRE.

No. 813,477.      Specification of Letters Patent.      Patented Feb. 27, 1906.

Application filed August 11, 1904. Serial No. 220,358.

*To all whom it may concern:*

Be it known that I, CHARLES C. WORTHINGTON, a citizen of the United States, residing at Dunnfield, Warren county, New Jersey, (whose post-office address is the same,) have invented certain new and useful Improvements in Vehicle-Wheel Tires, of which the following is a full, clear, and concise specification.

This invention relates to resilient metallic tires, and more particularly to improvements in the tires shown and described in a prior application, serially numbered 207,515, filed by me on May 12, 1904, whereby certain advantages in the operation and appearance of the devices are secured, as will be hereinafter fully explained.

Referring to the accompanying drawings, which form a part of this specification, and in which like reference-letters refer throughout to like parts, Figure 1 is a side elevation of a wheel embodying the present invention. Fig. 2 is a plan view with a portion of the resilient outer part of the tire broken away. Figs. 3 and 4 are respectively side elevation and plan of a section of an under tire of modified construction. Fig. 5 is a transverse sectional view of Fig. 4 on the line 5 5. Fig. 6 illustrates a modified shape of spring-rod. Fig. 6$^a$ is another modification in the shape of the rod; Fig. 6$^b$, a further modification of the shape of the rod. Fig. 7 is a side elevation of a portion of a wheel employing the rods of Fig. 6. Fig. 8 is a diagrammatic representation of the cross-sectional contour of the wheel-tread of Fig. 7. Fig. 9 is a further modification of the shape and style of rod. Fig. 10 is a plan view of an under tire with a number of the rods of Fig. 9 attached to it; and Fig. 11 is a diagrammatic cross-section of Fig. 10, illustrating the contour of the tread-surface thereof.

The wheel-tire is composed of a plurality of spring-rods A, bowed into the shape of arches surrounding the rotatable inner part W or wheel proper and disposed diagonally across the peripheral face thereof, as indicated in Figs. 1 and 2, so that the mid-portions of the several arches occupy successively different radial positions around the wheel, thereby forming a wheel-tread which is substantially circular in outline. The arches are preferably placed side by side and close together, if not in actual contact, so that each is supported by its neighbors against transverse or lateral pressures and also so that the working surface of the tread is practically a continuous surface. If the arches are not in actual contact, they may be supported by each other, if desired, by means of interposed connecting-bonds S. (Indicated in Fig. 4.) When the structure of the wheel or the rotatable inner part will permit, the rods may be secured by their ends or the ends of their arches directly upon it; but in wheels of the type shown in Figs. 1 to 7, which have usually a wooden felly, a surrounding metallic band or under tire B is employed which is attached to the felly in any suitable manner. This band does not come into working contact with the ground and is required, therefore, to be only of such strength as will withstand the bursting strain of the wheel and such additional strains as may be exerted by the spring-rods. The several rods may be secured to this under tire or to such other inner part as may be convenient in various ways, according to the shape of the rod, the structure of said inner part, or the fancy of the manufacturer. In the drawings the under tire is provided with parallel rows of sockets O around its opposite edges, and the opposite ends of the rods A are disposed in them in the diagonal relation described. The rod ends may be inclined, as shown in Fig. 1, so that the rods will be held therein by their own elasticity or tendency to spread. In Figs. 1 to 7 the sockets are shown as extending entirely through the under tire, being tapered to receive the correspondingly-tapered ends of the rods; but this construction is obviously not essential, and other equivalent means may be employed for preventing the rods from piercing the parts beneath when the sockets are formed as perforations through the under tire. In order to give a maximum of bearing-surface for the ends of the rods in Figs. 1 to 7, the sockets are formed in the two peripheral reinforcing-flanges C C, and the under tire may be decreased in weight with the same effect by cutting away portions of the flanges between sockets, thereby forming a series of bosses D, projecting from the under tire.

It will be observed that the number and size of the rods which constitute the resilient outer part, their cross-sectional shape, as well as the extent that each of the rods or the arches thereof embrace the rotatable inner part, are matters of degree which may be varied to suit special requirements without departing from this invention. The diagonal disposition of the rods upon the inner part may be caused to give to the tread-surface a cross-sectional contour which is curved or rounded, as shown by Fig. 2. This shape of tread is specially advantageous in that the surface of the same in actual contact with the ground is thereby proportioned to the weight of the load carried by the wheel, the same as in pneumatic and rubber tires, and the curvature of this surface may obviously be controlled by changing the curvatures of the several rods and their relative arrangement upon the inner part. Special formations of the rods will also tend to vary the contour of the tread.

In Fig. 6 a form of rod is exhibited in which a spring bend or jog E is formed near each end, which serve to increase the resilience of the rod and also to distribute or equalize the strains to which it is subjected, so as to obviate any tendency for the same to break near its points of attachment to the inner part. A wheel provided with rods of this shape is shown in Fig. 7, and the cross-sectional shape or contour of the tread of this wheel is indicated by the dotted lines of Fig. 8. The spring-bends above mentioned may be further developed into the general S shape shown by Fig 6$^a$, giving further resilience, or additional resilience may be secured by providing the rods with one or more loops, as shown by Fig. 6$^b$. It will be understood that the rods containing these auxiliary features may be relatively arranged upon and secured to their inner parts or under tires in the various manners contemplated above with reference to the rods of Fig. 1 and that their dimensions and shapes are matters which may be varied without departing from this invention.

In Figs. 9 to 11 the rods are each provided with two spring-loops F F, one at each end, and the extremities of the rods are shouldered and threaded, so as to be capable of positive attachment. The inner part of this form is composed of a band of thin material flanged over on its edges, as at G, for reinforcement and perforated to receive the threaded ends of the rods. This band or under tire may obviously be secured to the felly of a wheel, as in the preceding figures, or it may be attached directly to the wire spokes H, as shown. Furthermore, the contour of the tread-surface of this wheel may also be curved in various ways, according to the curvature of the central portions of its rods and their relative dispositions.

Having described my invention, what I claim, and desire to secure by United States Letters Patent, is—

1. A vehicle-wheel tire comprising an inner circular band adapted to be secured to the body of a wheel and a surrounding resilient outer part consisting of a plurality of arched spring-rods secured diagonally across the peripheral face of said band with the ends of their respective arches located on said band at fixed distances apart and the mid-portions thereof constituting a resilient wheel-tread.

2. In a vehicle-wheel, a rotatable inner part and a surrounding resilient outer part composed of a plurality of arched spring-rods disposed diagonally across the peripheral face of said inner part and arranged closely together for mutual reinforcement of each other against lateral or transverse pressure.

3. In a vehicle-wheel, a rotatable inner part and a surrounding resilient outer part composed of a plurality of arched spring-rods arranged side by side in contact with each other and disposed diagonally across the peripheral face of said inner part.

4. In a vehicle-wheel, a rotatable inner part and a surrounding resilient outer part composed of a plurality of arched spring-rods disposed across the peripheral face of said inner part with their opposite ends seated respectively at fixed distances apart in apertures in the opposite edges of said rotatable inner part.

5. In a vehicle-wheel tire, an under tire consisting of a circular band having its opposite edges thickened or reinforced, and a plurality of diagonal spring-rods formed as arches with their respective ends located at fixed distances apart and secured respectively to the opposite reinforced edges of said under tire, the mid-portions of said rods constituting a resilient wheel-tread.

6. In a vehicle-wheel, a rotatable inner part and a surrounding resilient outer part consisting of a plurality of spring-rods formed as arches embracing the inner part and disposed diagonally across the peripheral face thereof, the respective ends of the arches being located on the inner part at fixed distances apart and their mid-portions forming a resilient tread, in combination with bends in said arched rods arranged to distribute the strain therein.

7. In a vehicle-wheel tire, a tread-surface composed of the mid-portions of a plurality of arched spring-rods disposed in diagonal position with respect to the tread, an inner part to which the ends of said rods are secured at fixed distances apart and spring-bends in said rods.

8. In a vehicle-wheel tire, a tread-surface composed of a plurality of diagonally-disposed spring-rods and an inner part to which said rods are secured, said rods being formed as arches with their respective ends located at fixed distances apart, in combination with jogs or bends in said rods intermediate their centers and ends.

9. In a vehicle-wheel, an inner part formed with flanged edges, in combination with a plurality of diagonal spring-rods in the shape of arches secured to said flanged edges at their opposite ends.

10. In a vehicle-wheel, an inner part of thin material having flanged edges and a series of perforations in said edges, in combination with a plurality of spring-rods diagonally disposed around said inner part and formed as arches with their respective opposite ends secured in said perforations.

In testimony whereof I have signed my name to the specification in the presence of two subscribing witnesses.

CHARLES C. WORTHINGTON.

Witnesses:
  H. ROSSITER WORTHINGTON,
  W. J. P. MOORE.